United States Patent [19]

Henning

[11] 4,384,364
[45] May 17, 1983

[54] QUADRATURE MODULATION ARRANGEMENT WITH ENHANCED DYNAMIC AMPLIFICATION RANGE

[75] Inventor: Hansjuergen H. Henning, Summit, N.J.

[73] Assignee: Bell Telephone Laboratories, Incorporated, Murray Hill, N.J.

[21] Appl. No.: 137,276

[22] Filed: Apr. 4, 1980

[51] Int. Cl.³ .................. H04B 1/20; H04B 11/00; G01R 23/14
[52] U.S. Cl. .................................. 455/60; 367/135; 370/20
[58] Field of Search ............... 455/23, 40, 60, 61, 455/101, 103, 137, 139, 278, 276; 367/135, 131, 134; 370/20

[56] References Cited

U.S. PATENT DOCUMENTS

| | | | |
|---|---|---|---|
| 3,289,082 | 11/1966 | Shumate | 455/60 |
| 3,443,229 | 5/1969 | Becker | 455/60 |
| 3,518,680 | 6/1970 | McAuliffe | 455/60 |
| 3,656,097 | 4/1972 | Massa | 367/135 |
| 3,732,375 | 8/1973 | Kuribayashi | 370/20 |
| 3,757,288 | 9/1973 | Morin | 367/135 |
| 4,187,493 | 2/1980 | Patterson | 367/135 |
| 4,267,591 | 5/1981 | Wissel | 370/20 |

Primary Examiner—Tommy P. Chin
Attorney, Agent, or Firm—J. P. Kearns

[57] ABSTRACT

A quadrature modulation analog transmission system provides an extended dynamic range of amplification by dividing the total gain desired between the two quadrature channels without overloading the transmission medium. The direct channel furnishes a higher gain for low-level background noise signals, while the quadrature channel furnishes a lower gain for high-level signaling tones.

5 Claims, 3 Drawing Figures

QUADRATURE MODULATION ARRANGEMENT WITH ENHANCED DYNAMIC AMPLIFICATION RANGE

GOVERNMENT CONTRACT

The invention herein claimed was made in the course of or under a contract with the Department of the Navy.

BACKGROUND OF THE INVENTION

1. Field of the Invention

This invention relates generally to quadrature modulation systems for transmitting analog signals and more particularly to the application of quadrature modulation techniques to increasing the dynamic amplification range of such analog signals.

2. Description of the Prior Art

In quadrature modulation systems of the prior art two independent baseband, i.e., having frequency components extending to zero Hertz, signals are individually amplitude modulated with two carrier waves having the same frequency, but relative quadrature, i.e., separated by ninety electrical degrees, phases. The two resultant amplitude-modulated (AM) signals are subsequently combined to yield a single double-sideband AM signal which contains and preserves the information in the two independent baseband channels.

At the receiver the reconstruction of the individual baseband channels can be accomplished by precisely generating the two out-of-phase carriers and using them to demodulate the received double-sideband signal.

The objective of this quadrature modulation arrangement is to conserve frequency space in the transmission medium. A quadrature modulation system, as is well known, has twice the channel capacity in the same bandwidth as the single-channel double-sideband AM system.

In many telemetry systems, such as are used in geological and underwater survey systems, acoustical signals are employed to determine the nature of subterranean and submarine characteristics. There are in general two principal types of sounds encountered in either of these environments—ambient noise and calibrated impulsive or projector sounds for measuring transmission loss through rock strata or waters of varying salinity and temperature gradient. Ambient noise, with particular regard to submarine environments, arises from surface turbulence, biological noise, ships and oil rigs. These noises are passive from the viewpoint of the observer, i.e., the observer has neither control over, nor foreknowledge of, their occurrences. Transmission loss is measured in both subterranean and submarine environments from calibrated explosive charges or high-energy projector tones.

Ambient noise occurs at very low levels and produces responses in the tenths and hundredths of millivolts. Responses from explosive charges reach tens and hundreds of millivolts. The dynamic volume range to be observed thus extends upward to 90 decibels (DB). It is difficult and expensive to design and construct a single compact broadband amplifier and modulators with so expansive a dynamic range.

It is accordingly an object of this invention to provide a simplified amplifying system with a wide dynamic range.

It is another object of this invention to adapt a quadrature modulation arrangement to increase the dynamic range of baseband signals which can be transmitted by analog means.

It is a further object of this invention to provide a wide dynamic volume range over a coaxial cable by using quadrature-modulation principles.

SUMMARY OF THE INVENTION

The above and other objects of this invention are realized in a quadrature modulation arrangement having respective orthogonal-phase channels and a combiner by providing amplifiers of disparate gain in the respective channels. One channel is provided with a relatively low-gain amplifier to handle high-level input signals. Another channel is provided with a relatively high-gain amplifier for low-level input signals. The high-gain amplifier provides on the order of 20 to 30 DB higher gain than that of the low-gain amplifier in the one channel. A limiter is further advantageously provided in shunt of the high-gain amplifier in the one channel to block strong signals capable of saturating the high-gain amplifier. The orthogonal channels are combined for transmission over a single coaxial cable.

By employing carrier waves of differing frequencies a plurality of quadrature channel pairs of signals can be transmitted without interference over a single coaxial cable.

BRIEF DESCRIPTION OF THE DRAWING

The foregoing objects and features of the invention will be apparent from the following detailed description of the invention when read in conjunction with the accompanying drawings in which.

DETAILED DESCRIPTION

Figure 1:
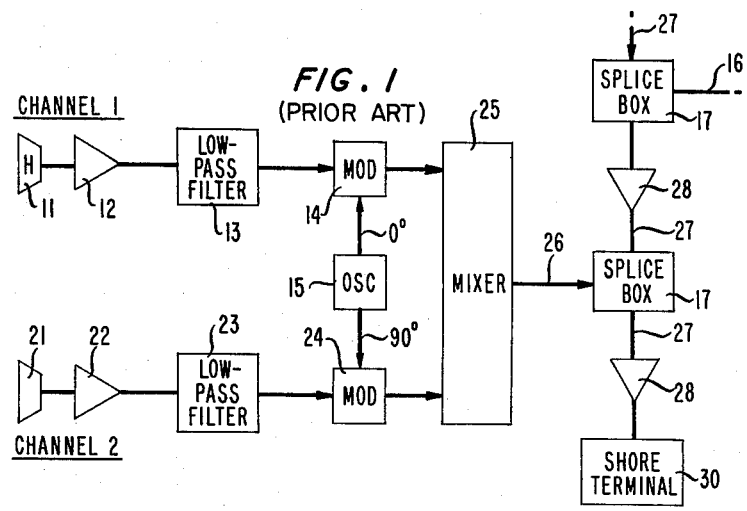
FIG. 1 is a block diagram of a known quadrature-channel transmission system useful in making underwater sound measurements.

The quadrature-modulation arrangement of this invention has utility in subterranean and submarine acoustic surveys for seismological or underwater sound monitoring purposes. As an illustrative embodiment, the underwater sound detection system is shown in the drawings. It is to be understood that the principles of this invention have application to sound detection systems in other environments, and probably to radio diversity and radio direction finding systems.

A representative acoustic survey system is embodied in a frequency-division multiplex system in which a plurality of hydrophones or other sound detection transducers are connected in series or parallel arrays to one or more coaxial cables leading to a shore terminal or to a temporarily stationary survey ship. Due to the multiplexing operations the acoustic energy arriving at each hydrophone is uniquely available at the monitoring terminal so that processing can be effected to determine, for example, directions of arrival of sounds picked up by more than one transducer.

FIG. 1 is a simplified block diagram of a known underwater sound monitoring system showing a repeatered coaxial cable 27 running along the sea bottom to a shore terminal 30. Splice boxes 17 and repeaters 28 are interspaced along coaxial cable 27. The splice boxes are spaced in accordance with a survey plan to intercept the acoustic energy of interest in a particular project. Metallic connections are made at the splice boxes to the center conductors of the main cable 27 with branch cables 16 and 26. Branch cable 16 is shown only as a stub. To branch cable 26 a pair of hydrophones 11 and 21 is connected through a quadrature modulation system. The purpose of the quadrature modulation arrangement is to conserve bandwidth to the extent that two hydrophone signals can be transmitted in the same frequency space without interference as a single double sideband signal. Furthermore, by frequency multiplexing on different carrier frequencies a plurality of pairs of signals can be transmitted over a single coaxial cable without interference.

FIG. 1 shows in particular that the acoustic signals received at each of hydrophones 11 and 21 in respective channels 1 and 2 are independently amplified in amplifiers 12 and 22. Since the signals incident on hydrophones 11 and 21 are at a very low level, amplifiers 12 and 22 must be capable of handling the full dynamic range of the system. The amplifier signals are acted on by low-pass filters 13 and 23 to contain the bandwidth of the system and to prevent extraneous noise from contaminating the system. In order to conserve frequency space the filtered signals are modulated onto quadrature phases of a single-frequency carrier wave in modulators 14 and 24. The single-frequency carrier wave is generated in oscillator 15, which can advantageously be crystal controlled. Two output phases 90 degrees apart are made available by conventional means at outputs marked zero degrees and 90 degrees. The zero degree output is applied to modulator 14 to form a direct modulated output for application to mixer 25. Similarly, the 90 degree output is applied to modulator 24 to form a quadrature modulated output for application also to mixer 25. Mixer 25 combines the direct and quadrature modulated signals into a composite signal on lead 26. In splice box 17 the composite signal is directly coupled to coaxial transmission line 27 for conveyance to shore terminal 30.

There are two major classes of signals that need to be analyzed in oceanographic surveys: ambient noise and impulsive or projector sounds used in measuring transmission loss.

Ambient noise arises from natural or man-made sources and needs to be measured to provide a reference state. Typical ambient noise sources are sea state both at the surface and beneath the surface; biological, from underwater marine life; shipping, from machinery and motion through the surf; and oil rig operations. Ambient noise incident on a detecting hydrophone tends to be of very low level and hence a high-gain amplifier is required to bring the electrical analog of the noise energy up to a state susceptible to measurement and analysis.

The measurement of transmission loss results, however, from the generation of high-level bursts of energy from the explosion of calibrated amounts of TNT or equivalent material at predetermined depths and distances from the hydrophone and also from tone projectors towed through the water. For conveying the electrical equivalent of this impulsive energy to a measurement station little, if any, gain is required.

Where the same hydrophone is being employed to respond to both ambient noise and explosive charge energy, an extremely wide dynamic range of amplification is required; on the order of ninety DB. Such a wide range is difficult to achieve in a single amplifier and modulator combination that is rugged and reliable enough to serve in a marine environment. Thus, in the quadrature channel arrangement in FIG. 1 it is necessary to dedicate hydrophone 11 and its associated channel one, for example, to the detection of ambient noise and design amplifier 12 for high gain. Concomitantly, hydrophone 21 and its associated channel two are dedicated to the detection of impulsive noise and consequently amplifier 22 is designed for low gain.

Figure 2:
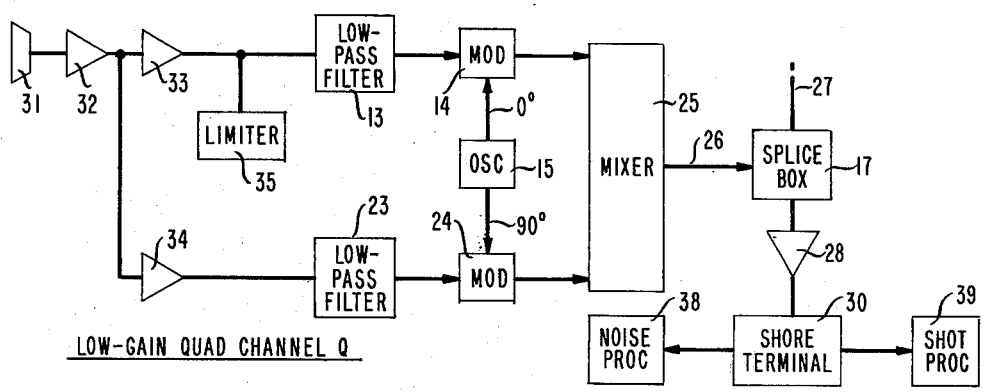
FIG. 2 is a block diagram of a quadrature-modulation arrangement for providing an enhanced dynamic range according to this invention.

According to this invention, as shown in FIG. 2, a single hydrophone 31 replaces the two hydrophones 11 and 21 of FIG. 1. Direct channel D replicates low-pass filter 13 and modulator 14 of channel one in FIG. 1. Quadrature channel Q similarly replicates low-pass filter 23 and modulator 24 of FIG. 1. Common oscillator 15 and mixer 25 are the same in structure and function as those in FIG. 1. The structure of FIG. 2 differs from that of FIG. 1 by comprising common preamplifier 32, high-gain amplifier 33, low-gain amplifier 34 and limiter 35. Mixer 25 is connected to coaxial cable 27 over conductor 26 and splice box 17, as in FIG. 1. Gain on coaxial cable 27 is maintained conventionally by repeater 28. Signals are received at shore terminal 30 and are separately demodulated into ambient-noise signals from channel D and impulsive bursts or projector signals from channel Q. Channel D signals are directed to noise processor 38 and channel Q signals, to shot processor 39.

The signal incident on hydrophone 31 is preamplified at a low level of gain in amplifier 32 over the full dynamic range of the composite signal. In channel D amplifier 33 is provided with a high gain $G_1$ on the order of 60 DB to handle low-level ambient noise in an appropriate fashion. Design factors in modulator 14, such as intermodulation crosstalk or overload distortion, limit the dynamic range of the channel. Limiter 35 blocks or truncates high-level impulsive signals from channel D. Signals in channel D are modulated with a zero-phase reference carrier from oscillator 15.

In channel Q high-level impulsive noise signals, which would have severely overload channel D, are amplified in amplifier 34 at low gain $G_2$, 20 to 30 DB below gain $G_1$. These signals are modulated with a quadrature-phase reference signal from oscillator 15.

Figure 3:
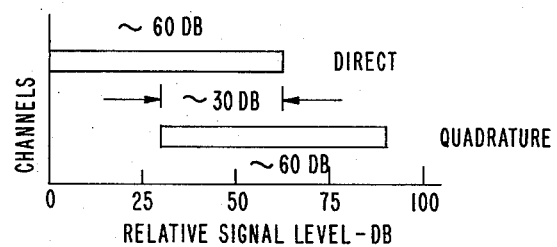
FIG. 3 is a signal level bar chart useful in the explanation of this invention.

FIG. 3 is a relative signal level diagram for channels D and Q. Channel D handles low-level signals of the ambient noise type from vanishingly small to 60 DB. Channel Q handles high-level signals in a range of about 30 DB to 90 DB. There is thus an overlap in signal levels of the two principal types of about 30 DB. Limiter 35 has its threshold set preferably near the low end of the overlap range to prevent impulsive signals from overloading channel D.

No attempt is made to combine the output signals from channels D and Q into a single composite signal. The two signals are of disparate character and are independent in origin. In any event upon the occurrence of impulsive noise, channel D is substantially blocked by limiter 35.

At the demultiplexer in shore terminal 30 the quadrature-related signals from channels D and Q are separately demodulated to baseband in a conventional manner. Channel D ambient-noise signals are applied to processor 38 for analysis. Channel Q impulsive-noise signals are applied to processor 39 for determination of transmission loss along the acoustic path between the location of the calibrated projector charge and the location of hydrophone 31. It is understood that hydrophone 31 is merely one of a predetermined array whose several signals are multiplexed with a plurality of carrier frequencies and conducted over cable 27 to shore terminal 30.

A significant limitation of quadrature modulated transmission systems is the amount of crosstalk loss between D and Q channels that remains after demodulation. If out-of-band pilot tones and phase-locked loops are used to generate the demodulating carrier waves at the demodulator, a crosstalk loss as high as 55 DB can be achieved.

The effect of crosstalk can be analyzed as follows. When low-level ambient noise measurements are being made, the crosstalk from low-gain channel Q into high-gain channel D is about 55 DB plus 30 DB (the relative gain difference between the two channels) or 85 DB down from the desired signal. This type of crosstalk is sufficiently below the desired ambient signal to be of no consequence. The crosstalk from high-gain channel D into low-gain channel D is more critical, however. When a projector tone from a noise maker towed by a survey vessel attains a level of 60 DB, the upper bound of the overlapping range, the crosstalk into channel Q is the 60 DB signal level increased by the channel gain difference of 30 DB less the crosstalk loss of 55 DB, or about 35 DB. The level of the desired signal in the low-gain channel Q is then 60 DB. Hence, the crosstalk term is only 25 DB below the desired signal. The correlation between the desired signal and the crosstalk is such that they add in phase. This results in an effective gain change of the desired signal by 0.5 DB and meets the calibration accuracy requirement for signal tone measurements of a submarine acoustic survey system.

The desired signal to crosstalk ratio remains the same for all levels of interest in the overlapping range. Due to the presence of the limiter in channel D the ratio improves for signal levels above the overlapping range.

While this invention has been disclosed by way of a single illustrative embodiment, its principles are valid over a wide range of modification which may occur to those skilled in the seismological and oceanographic arts as set forth in the appended claims.

I claim:

1. A quadrature modulation transmission system with extended dynamic amplification range including in-phase and quadrature-phase modulators supplied with orthogonal carrier waves from a common source and a line mixer combining in-phase and quadrature-phase components into a composite signal for application to a transmission line CHARACTERIZED IN THAT a first relatively high-gain amplifier is provided in series with the in-phase modulator for low-level broadband components, a second amplifier with lesser gain than said first amplifier is provided in series with the quadrature-phase modulator for high-level discrete-frequency components and a common analog signal source furnishes an input to said first and second amplifiers in parallel.

2. The quadrature modulation system defined in claim 1 further CHARACTERIZED IN THAT a limiter is provided in the path of said first high-gain amplifier to preclude saturating such amplifier with high-level signals.

3. The quadrature modulation system defined in claim 1 further CHARACTERIZED IN THAT a remotely located receiver responds to said composite signal traversing said system.

4. The quadrature modulation system defined in claim 1 further CHARACTERIZED IN THAT
a preamplifier furnishes an input in series with said common signal source and said first and second amplifiers in parallel.

5. In combination with a submarine acoustic survey system,
(a) a hydrophone responsive to acoustic signals of wide dynamic range;
(b) a preamplifier for signals incident at said hydrophone;
(c) a first transmission channel connected to said preamplifier comprising in series
  (1) a first amplifier of relatively high gain for low-level signal components,
  (2) a limiter for prevention of saturation in said first amplifier,
  (3) a first low-pass filter, and
  (4) a first modulator;
(d) a second transmission channel also connected to said preamplifier comprising in series,
  (1) a second amplifier of relatively low-gain for high level signal components,
  (2) a second low-pass filter, and
  (3) a second modulator;
(e) a carrier wave source supplying orthogonally related phases of a common frequency to said first and second modulators, respectively;
(f) a mixer for combining modulated signals from said first and second modulators into a composite signal; and
(g) a transmission line for conveying said composite signal to a remote monitoring terminal.

* * * * *